Feb. 13, 1962     H. S. SWANSON     3,020,754
BALANCE APPARATUS FOR WIND TUNNEL
Filed July 14, 1958
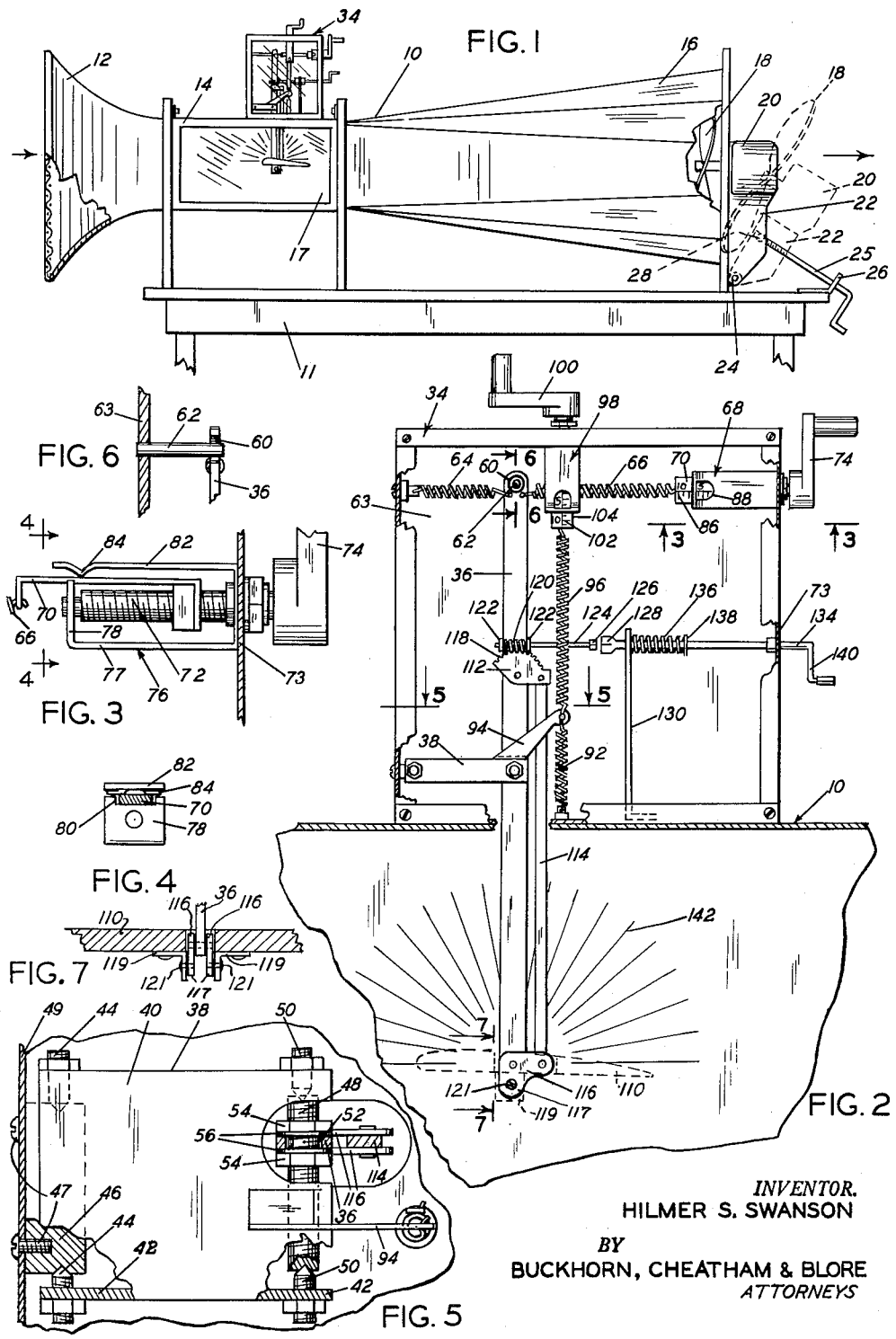
INVENTOR.
HILMER S. SWANSON
BY
BUCKHORN, CHEATHAM & BLORE
ATTORNEYS

United States Patent Office 3,020,754
Patented Feb. 13, 1962

3,020,754
BALANCE APPARATUS FOR WIND TUNNEL
Hilmer Sigfrid Swanson, Canby, Oreg.
(4018 S. 272nd St., Kent, Wash.)
Filed July 14, 1958, Ser. No. 748,504
9 Claims. (Cl. 73—147)

The present invention relates to a wind tunnel for testing air foils and more particularly to a simplified balance apparatus for use in a wind tunnel to test the forces imposed upon a test air foil or model.

It is a principal object of the present invention to provide a wind tunnel construction of simplified design for use in schools and the like to demonstrate the theory of flight and the effect of moving air upon various air foils.

More particularly, it is an object of the invention to provide a simplified balance apparatus for supporting an air foil section in a wind tunnel and for measuring the lift and drag forces imposed upon such an air foil.

It is a further object of the invention to provide a balance apparatus having simply and easily operated means for changing the angle of attack of an air foil supported thereon.

Another object of the invention is to provide a balance system capable of retaining an air foil in a predetermined position in an air stream while obtaining measurement of the forces imposed upon the air foil.

Still another object of the invention is to provide a simplified arrangement in a wind tunnel for varying the velocity of air flow therethrough.

Other objects and advantages of the invention will become more apparent hereinafter.

For a more complete description of the invention, reference is made to the following specification and accompanying drawings wherein:

FIG. 1 is a side elevation of a wind tunnel constructed in accordance with the present invention;

FIG. 2 is an enlarged fragmentary view of the air foil balance arrangement utilized in the present invention;

FIG. 3 is an enlarged fragmentary view of the mechanism utilized for adjusting the force neutralizing springs utilized in the balance of the invention;

FIG. 4 is a view taken along line 4—4 of FIG. 3;

FIG. 5 is a view taken along line 5—5 of FIG. 2;

FIG. 6 is an enlarged sectional view taken along line 6—6 of FIG. 2; and

FIG. 7 is a view taken along line 7—7 of FIG. 2.

The present invention is illustrated in connection with a wind tunnel 10 supported upon a suitable base such as a table 11, the wind tunnel having an inlet end 12, a throat or test section 14 and an outlet end 16. One side 17 of the test section may be formed as an access door of glass or other transparent material to permit access to and viewing of the air foil under test. To draw air through the wind tunnel 10, a fan 18 is provided and preferably means are provided for varying the position of the fan relative to the exit opening whereby the velocity of the air through the wind tunnel 10 may be varied. In the illustrated embodiment of the invention, the fan 18 is driven by an electric motor 20 mounted on a base 22 pivotally supported at 24 upon the table 11. The position of the motor 20 and base 22 may be adjusted in the illustrated embodiment by means of a hand crank 25 supported in a bracket 26 mounted on the table 11 and threadedly engaging a suitable nut indicated at 28 mounted in the bracket 22. By moving the fan 18 from its forward position outwardly and away from the exit opening of the wind tunnel, the air velocity through the wind tunnel can be reduced. By reverse movement, that is by moving the fan inwardly toward the opening, the velocity of the air moving through the wind tunnel will increase.

Mounted on the throat section 14 is a balance box 34 which provides a support base for the air foil supporting balance mechanism and which will now be described. The balance mechanism includes a vertically extending strut 36, the upper portion of which is positioned within the balance box 34 and the lower portion of which extends downwardly into the wind tunnel throat section 14 through an opening provided therefor in the top wall of the throat section. The strut 36 is pivotally mounted at an intermediate point thereon upon a horizontal support arm or pivot plate 38 which includes a flat horizontal web section 40 and opposite depending flanges 42. The pivot plate is pivotally supported upon one of the walls of the balance box 34 by means of cone point pivot screws 44 which engage within suitable recesses in the opposite ends of a pivot block 46 secured by screws 47 or other means to a wall 49 of the balance box 34. Supported between the flanges 42 at the opposite end of the pivot plate 38 is a threaded shaft 48 mounted between a pair of pivot screws 50 extending through the flanges 42. The shaft 48 extends through an opening 52 provided in the strut 36 and the strut 36 is fixed in position along the shaft 48 by means of a pair of oppositely positioned nuts 54, there being washers 56 positioned between the nuts 54 and the opposite sides of the strut 36. The pivot plate 38 and associated structure stabilizes the air foil under test and the strut 36 against movement by virtue of any side thrusts and permits movement of the strut only by reason of the lift or drag components of forces upon the test air foil.

It will be observed that any vertical forces from an air foil supported on the lower end of the strut by means hereinafter to be described will tend to cause the strut to move vertically and effect pivoting of the pivot plate 38 about its connection to the balance box 34. Likewise, drag forces will tend to cause the strut 36 to pivot about its mounting upon the pivot plate 38. To measure such forces, force balance means including a force indicator are provided for measuring the lift forces imposed on the strut 36 by an air foil and for neutralizing such forces so as to retain the air foil in a predetermined vertical position. Force balance means including a force indicator are also provided so that the drag forces imposed on the strut 36 by an air foil may be measured and neutralized again to retain the strut in a given horizontal position. Such means will now be described. Referring first to FIGS. 2 and 6, cooperative indicator means are provided on the strut and the balance box to indicate any change in position of the strut. In the illustrated embodiment of the invention, the upper end of the strut 36 is provided with an enlarged circular opening 60 through which extends an index pin 62 suitably mounted on the back wall 63 of the balance box 34. By maintaining the opening 60 concentric with the pin 62, the position of the strut 36 may be maintained constant.

The force balance means for neutralizing and measuring the drag forces imposed upon the strut 36 includes a tension spring 64 connected between the strut 36 and the side wall 49 of the balance box 34 and an oppositely extending tension spring 66 connected at one end to the strut 36 and at its opposite end to an adjustable force indicating mechanism 68. As best shown in FIG. 3, the force indicator 68 includes a movable indicator arm 70 to which the spring 66 is directly connected. The indicator arm 70 is threadedly engaged upon a screw shaft 72 which extends outwardly of the balance box 34 through the wall 73 thereof and has affixed to its outer end a crank arm 74 for effecting rotation of the screw. The screw 72 is supported in a box like bracket 76 suitably fixed to the wall 73 and which bracket includes a side portion 77 extending perpendicularly from said wall and a right angularly bent end portion 78 having a shallow groove 80 (FIG. 4) formed therein for receiving the indicator arm 70 and preventing it from rotating with the screw shaft 72. The indicator arm 70 is retained within the groove 80 by an opposite side or arm 82 of the bracket 76 formed with an offset portion 84 which resiliently engages the indicator arm 70. The indicator arm 70 is provided with indicia 86 thereon so that its relative position to the end of the bracket arm 82 may be determined and preferably the bracket arm 82 is formed with an opening 88 to observe the indicia immediately adjacent its end. As will be observed, by rotating the crank arm 74 the indicator arm 70 can be retracted or advanced to vary the tension applied by the spring 66 to the strut 36 and thus overcome the drag forces which would tend to move the strut from its neutral position. The position of the indicator arm as determined from the indicia 86 gives a measure of the drag forces imposed upon the air foil being tested.

The vertical forces applied to the strut 36 by an air foil are similarly neutralized and measured. The means provided for this purpose includes a spring 92 connected between the bottom wall of the balance box 34 and a lift arm 94 fixed to and extending from the pivot plate 38. A second vertically extending spring 96 is connected between the lift arm 94 and a force indicating mechanism 98 which is substantially identical in construction to the force indicator 68 and includes an adjustment handle 100 for varying the tension of the spring 96 as necessary to neutralize the lift forces. Indicia 102 is provided upon the balance arm 104 of the force indicator 98 and by means of which a measure can be made of the lift forces on the test air foil. It will be observed that with the balance apparatus described the position of an air foil under test may be maintained unchanged for accurate comparison of the effect on the air foil of different air velocities and other conditions. A further advantage of maintaining the position of the strut 36 vertical is that only when the strut is in such position are the lift and drag forces mutually perpendicular enabling their separate measurement.

Means are also provided for adjustably supporting an air foil on the bottom of the strut 36 so that the angle of attack of the air foil may be varied. Referring now more particularly to FIG. 2, the test air foil is indicated at 110 and which is supported on the strut 36 by means of a parallelogram linkage including the strut, a pair of opposite upper links 112, a side link 114 and a pair of lower links 116, the air foil 110 being fixedly secured by suitable means between the lower links 116. Preferably the lower links 116 are each in the form of a bell crank having a depending arm portion 117. The air foil or model under test is mounted on the strut 36 with the center of lift and drag coaxial with the pivot axis of the links 116 to the strut 36. This eliminates the creation of a moment arm upon any change in angle of the air foil. While the mounting of the foil can be accomplished in many ways, one method is to form the air foil with an aperture for receiving the strut 36 and links 116 with brackets 119 provided on the air foil which may be secured by screws 121 to the links 116 as shown in FIG. 7.

Means are provided for adjustably changing the position of the linkage. In the illustrated embodiment of the invention, a gear sector 118 is provided on one of the upper links 112 and which sector is engaged by a worm 120 rotatably mounted between brackets 122 supported on the strut 36. The worm 120 is formed on the end of a horizontally extending shaft 124 having a polygonal head 126 formed thereon. To engage the head 126 and effect rotation of the worm gear 120, there is provided a cooperatively shaped socket driver 128 formed on the end of a shaft 134 which extends horizontally through a supporting stand 130 and outwardly through the wall 73 of the balance box 34. A compression spring 136 arranged between the stand 36 and a collar 138 on the shaft 134 normally biases the socket 128 out of engagement with the head 126. By manually pressing the shaft 134 and socket 128 inwardly, the head 126 can be engaged and the position of the linkage can be adjusted by rotating the shaft 134 and for which purpose a crank arm 140 may be provided thereon.

It should be understood that the parallelogram linkage for adjusting the angle of attack of the air foil is optional and that such linkage could be omitted and the air foil section to be tested could be attached directly to the bottom end of the strut 36.

The wind tunnel may also be provided with suitable apparatus well known to those skilled in the art to measure the air velocity through the tunnel and such other information such as air temperature as may be desired.

Having illustrated and described a preferred embodiment of the invention, it should be apparent to those skilled in the art that the invention permits of modification in arrangement and detail. I claim as my invention all such modifications as come within the true spirit and scope of the appended claims.

I claim:

1. Apparatus for supporting an air foil in an air stream to measure the lift and drag on said air foil comprising a base, a vertically extending air foil support strut having means at its lower end for attachment thereto of an air foil, a horizontally extending support arm having one end secured to said base for rotation about a first horizontal axis and its other end pivotally connected to an intermediate point of said strut for pivotal movement of the latter about a second horizontal axis parallel to said first axis, said axes being perpendicular to the direction of said air stream, cooperative indicator means on said strut and said base for indicating any change in position of said strut relative to said base, first force balance means operatively connected between said base and said support arm including a force indicator for adjusting the force applied to said arm whereby lift forces imposed on said strut by an air foil may be measured and neutralized to retain said strut in a given vertical position, second force balance means including a force indicator for adjusting the force applied to said strut whereby the drag forces imposed on said strut by an air foil may be measured and neutralized to retain said strut in a given horizontal position.

2. Apparatus for supporting an air foil in an air stream to measure the lift and drag on said air foil comprising a base, a vertically extending air foil support strut having means at its lower end for attachment thereto of an air foil, a horizontally extending support arm having one end secured to said base for rotation about a first horizontal axis and the other end thereof pivotally connected to an intermediate point of said strut for pivotal movement of the latter about a second horizontal axis parallel to said first axis, said axes being perpendicular to the direction of said air stream, cooperative indicator means on said strut and said base for indicating any change in position of said strut relative to said base, first spring means operatively connected between said base and said support arm for imparting a downward force on said arm, second spring means operatively connected between said base and said support arm for imparting an upward force on said arm, adjustment means including a force indicator operatively arranged with one of the aforesaid spring means for adjusting the tension of such spring means and thus the force applied to said arm whereby lift forces imposed on said strut by an air foil may be measured and neutralized to prevent movement of said strut in a vertical direction, third spring means operatively arranged between said base and said strut for imparting a horizontal force in a direction to oppose pivotal movement of said strut about said arm in a clockwise direction, fourth spring means operatively arranged between said base and said strut for imparting a horizontal force in a direction to oppose pivotal movement of said strut about said arm in a counter-clockwise direction, and second adjustment means including a force indicator operatively connected with one of said third and fourth spring means for adjusting the tension of such spring means and thus the force applied to said strut whereby the drag forces imposed on said strut by an air foil may be measured and neutralized to prevent rotation of said strut about said support arm.

3. Apparatus for supporting an air foil in an air stream to measure the lift on said air foil comprising a base, a vertically extending air foil support strut having means at its lower end for attachment thereto of an air foil, a horizontally extending support arm having one end secred to said base for rotation about a first horizontal axis and its other end pivotally connected to an intermediate point of said strut for pivotal movement of the latter about a second horizontal axis parallel to said first axis, said axes being perpendicular to the direction of said air stream, cooperative indicator means on said strut and said base for indicating any change in position of said strut relative to said base, a first coil spring operatively connected between said base and said support arm for imparting a downward force on said arm, a second coil spring operatively connected between said base and said support arm for imparting an upward force on said arm, a pair of interengaging cooperatively threaded members, one of said members being secured to said base and the other being movable relative to said one member in the longitudinal direction of said one spring means, means connecting said other member to said one spring means whereby by adjustment of the relative position of said members to one another the tension of said springs may be varied, and means for indicating the relative position of said members to one another.

4. Apparatus for supporting an air foil in an air stream to measure the lift on said air foil comprising a base, a vertically extending air foil support strut having means at its lower end for attachment thereto of an air foil, a horizontally extending support arm having one end secured to said base for rotation about a first horizontal axis and its other end pivotally connected to an intermediate point of said strut for pivotal movement of the latter about a second horizontal axis parallel to said first axis, said axes being perpendicular to the direction of said air stream, cooperative indicator means on said strut and said base for indicating any change in position of said strut relative to said base, a first coil spring operatively connected between said base and said support arm for imparting a clockwise force on said arm, a second coil spring operatively connected between said base and said support arm for imparting a counter-clockwise force on said arm, a pair of interengaging cooperatively threaded members, one of said members being secured to said base and the other being movable relative to said one member in the longitudinal direction of said one spring means, means connecting said other member to said one spring means whereby by adjustment of the relative position of said members to one another the tension of said springs may be varied, and means for indicating the relative position of said members to one another.

5. Apparatus for supporting an air foil in an air stream to measure the lift and drag on said air foil comprising a base, a vertically extending air foil support strut having means at its lower end for attachment thereto of an air foil, a horizontally extending support arm having one end secured to said base for rotation about a first horizontal axis and its other end pivotally connected to an intermediate point of said strut for pivotal movement of the latter about a second horizontal axis parallel to said first axis, said axes being perpendicular to the direction of said air stream, cooperative indicator means on said strut and said base for indicating any change in position of said strut relative to said base, first force balance means operatively connected between said base and said support arm including a force indicator for adjusting the force applied to said arm whereby lift forces imposed on said strut by an air foil may be measured and neutralized to retain said strut in a given vertical position, second force balance means including a force indicator for adjusting the force applied to said strut whereby the drag forces imposed on said strut by an air foil may be measured and neutralized to retain said strut in a given horizontal position, a parallelogram linkage including said strut, a side link extending substantially parallel to said strut, an upper link extending between said strut and the upper end of said side link, and a lower link extending between the lower end of said strut and said side link, said lower link having means for securing thereto an air foil so that by changing the angular relationship between said lower link and said strut, the angle of attack of an air foil secured to said lower link may be changed, and means for adjustably changing the position of said linkage.

6. Apparatus for supporting an air foil in an air stream to measure the lift and drag on said air foil comprising a base, a vertically extending air foil support strut having means at its lower end for attachment thereto of an air foil, a horizontally extending support arm having one end secured to said base for rotation about a first horizontal axis and its other end pivotally connected to an intermediate point of said strut for pivotal movement of the latter about a second horizontal axis parallel to said first axis, said axes being perpendicular to the direction of said air stream, cooperative indicator means on said strut and said base for indicating any change in position of said strut relative to said base, first force balance means operatively connected between said base and said support arm including a force indicator for adjusting the force applied to said arm whereby lift forces imposed on said strut by an air foil may be measured and neutralized to retain said strut in a given vertical position, second force balance means including a force indicator for adjusting the force applied to said strut whereby the drag forces imposed on said strut by an air foil may be measured and neutralized to retain said strut in a given horizontal position, a parallelogram linkage including said strut, an upper link extending substantially parallel to said strut, an upper link extending between said strut and the upper end of said side link, and a lower link extending between the lower end of said strut and said side link, said lower link having means for securing thereto an air foil so that by changing the angular relationship between said lower link and said strut, the angle of attack of an air foil secured to said lower link may be changed, a gear sector on one of said links, a worm meshing with said gear sector mounted on an adjacent link, and means for driving said worm gear.

7. In a balance apparatus for a wind tunnel having means for imposing an air stream in a given direction, a support base for said apparatus, a vertically extending strut having means at its lower end for supporting an air foil, a pivot plate including a flat, horizontal web section, means pivotally mounting said pivot plate on said base at one end of said plate solely for pivotal movement of the plate about a horizontal axis extending at right angles to said air stream, a horizontally extending shaft rotatably mounted on the opposite end of said pivot plate in axially parallel relation to said axis, and means fixedly mounting said strut on said shaft so that said strut is stabilized against movement by components of force parallel to the axis of said shaft but is free to swing about said axis in response to components of force extending at right angles to said shaft axis.

8. In a balance apparatus for a wind tunnel, a support base for said apparatus, a vertically extending strut having means at its lower end for supporting an air foil, a pivot plate including a flat, horizontal web section having depending flanges along a pair of opposite edges thereof, a pair of opposite pivot screws mounted in said flanges adjacent one end of said pivot plate, a pivot block on said base having opposite, horizontally aligned recesses receiving said pivot screws and pivotally supporting said plate for rotation about a horizontal axis, a second pair of pivot screws mounted in said flanges adjacent the opposite end of said pivot plate, a horizontally extending shaft engaged between and supported by said second pair of pivot screws for rotation about an axis parallel to said first mentioned axis, and means fixedly securing said strut to said shaft so that said strut is stabilized against movement by components of force parallel to the axis of said shaft but is free to swing about said axis in response to components of force extending at right angles to said shaft axis.

9. In combination a wind tunnel, a fan disposed at one end of said tunnel for moving air through said tunnel, and means for varying the position of said fan relative to said tunnel end so as to effect changes in the velocity of air moving through said tunnel, said means including a base pivotally mounted adjacent said tunnel end for movement toward and away from said tunnel end, means mounting said fan on said base, means for driving said fan, and means for adjusting the position of said base.

References Cited in the file of this patent

UNITED STATES PATENTS

| | | |
|---|---|---|
| 1,968,382 | Fales | July 31, 1934 |
| 2,065,496 | Adams | Apr. 28, 1942 |
| 2,281,001 | Clewell | Apr. 28, 1942 |
| 2,353,033 | Hem | July 4, 1944 |
| 2,380,516 | Goldberg | July 31, 1945 |